(12) United States Patent
Long et al.

(10) Patent No.: US 9,175,230 B2
(45) Date of Patent: Nov. 3, 2015

(54) CRACKING CATALYST AND A PROCESS FOR PREPARING THE SAME

(75) Inventors: Jun Long, Beijing (CN); Zhonghong Qiu, Beijing (CN); Youbao Lu, Beijing (CN); Jiushun Zhang, Beijing (CN); Zhijian Da, Beijing (CN); Huiping Tian, Beijing (CN); Yuxia Zhu, Beijing (CN); Wanhong Zhang, Beijing (CN); Zhenbo Wang, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 1352 days.

(21) Appl. No.: 11/658,831

(22) PCT Filed: Jul. 14, 2005

(86) PCT No.: PCT/CN2005/001042
§ 371 (c)(1),
(2), (4) Date: May 31, 2007

(87) PCT Pub. No.: WO2006/010316
PCT Pub. Date: Feb. 2, 2006

(65) Prior Publication Data
US 2008/0293561 A1 Nov. 27, 2008

(30) Foreign Application Priority Data

Jul. 29, 2004 (CN) .......................... 2004 1 0071118
Jan. 31, 2005 (CN) .......................... 2005 1 0004961

(51) Int. Cl.
| | | |
|---|---|---|
| *B01J 29/00* | (2006.01) | |
| *B01J 29/80* | (2006.01) | |
| *C10G 11/05* | (2006.01) | |
| *B01J 29/06* | (2006.01) | |
| *B01J 29/08* | (2006.01) | |
| *B01J 21/04* | (2006.01) | |
| *B01J 27/16* | (2006.01) | |
| *B01J 29/40* | (2006.01) | |
| *B01J 29/70* | (2006.01) | |
| *B01J 29/85* | (2006.01) | |
| *B01J 37/00* | (2006.01) | |

(52) U.S. Cl.
CPC .............. *C10G 11/05* (2013.01); *B01J 29/06* (2013.01); *B01J 29/084* (2013.01); *B01J 21/04* (2013.01); *B01J 27/16* (2013.01); *B01J 29/40* (2013.01); *B01J 29/70* (2013.01); *B01J 29/80* (2013.01); *B01J 29/85* (2013.01); *B01J 37/0045* (2013.01); *B01J 2229/42* (2013.01); *C10G 2400/02* (2013.01)

(58) Field of Classification Search
None
See application file for complete search history.

(56) References Cited

U.S. PATENT DOCUMENTS

| | | | | |
|---|---|---|---|---|
| 2,886,513 | A * | 5/1959 | Baker ........................... | 208/121 |
| 2,988,498 | A * | 6/1961 | Gilbert ......................... | 208/138 |
| 3,354,096 | A * | 11/1967 | Young ............................ | 502/73 |
| 3,764,520 | A * | 10/1973 | Kimberlin et al. ........ | 208/111.15 |
| 4,289,606 | A * | 9/1981 | Gladrow et al. ........... | 208/120.1 |
| 4,430,199 | A * | 2/1984 | Durante et al. .............. | 208/114 |
| 4,588,706 | A * | 5/1986 | Kukes et al. .................. | 502/211 |
| 4,661,239 | A * | 4/1987 | Steigleder ................ | 208/111.15 |
| 4,664,780 | A * | 5/1987 | Lochow et al. ........... | 208/120.01 |
| 5,035,868 | A * | 7/1991 | Occelli ......................... | 423/713 |
| 5,306,417 | A | 4/1994 | Cheng et al. | |
| 5,601,699 | A * | 2/1997 | Degnan et al. .............. | 208/114 |
| 5,624,547 | A * | 4/1997 | Sudhakar et al. ............. | 208/89 |
| 5,932,777 | A * | 8/1999 | Sughrue et al. .............. | 585/322 |
| 5,951,963 | A * | 9/1999 | He et al. ....................... | 423/713 |
| 5,958,818 | A * | 9/1999 | Demmel et al. ................ | 502/68 |
| 6,444,610 | B1 * | 9/2002 | Yamamoto .................... | 502/325 |
| 6,677,263 | B2 * | 1/2004 | Wang et al. ..................... | 502/73 |
| 6,710,008 | B2 * | 3/2004 | Chang et al. .................. | 502/214 |
| 7,514,385 | B2 * | 4/2009 | Du et al. .......................... | 502/73 |
| 2003/0047487 | A1 * | 3/2003 | Ziebarth et al. .......... | 208/120.01 |

FOREIGN PATENT DOCUMENTS

| | | |
|---|---|---|
| CN | 1072201 A | 5/1993 |
| CN | 1085825 A | 4/1994 |
| CN | 1194181 A | 9/1998 |
| CN | 1042201 C | 2/1999 |

(Continued)

OTHER PUBLICATIONS

Chuah et al, The effect of digestion of the surface area and porosity of alumina, 2000, microporous and mesoporous materials, 37, pp. 345-353.*

(Continued)

*Primary Examiner* — Melvin C Mayes
*Assistant Examiner* — Stefanie Cohen
(74) *Attorney, Agent, or Firm* — Novick, Kim & Lee, PLLC; Zhi Yang Xue

(57) ABSTRACT

A cracking catalyst, which contains alumina, phosphorus and molecular sieve, with or without clay, wherein said alumina is η-alumina or a mixture of η-alumina and χ-alumina and/or γ-alumina, and wherein the catalyst contains, on the basis of the total amount of the catalyst, 0.5-50 wt % of η-alumina, 0-50 wt % of χ-alumina and/or γ-alumina, 10-70 wt % of molecular sieve, 0-75 wt % of clay, and 0.1-8 wt % of phosphorus, measured as $P_2O_5$. The catalyst not only has higher cracking activity and higher cracking ability for cracking heavy oil, but also improves significantly quality and yield of gasoline, LCO and LPG in cracking products.

30 Claims, No Drawings

(56) References Cited

FOREIGN PATENT DOCUMENTS

| | | | |
|---|---|---|---|
| CN | 1055301 | C | 8/2000 |
| CN | 1325940 | A | 12/2001 |
| CN | 1341697 | A | 3/2002 |
| CN | 1354224 | A | 6/2002 |
| CN | 1384173 | A | 12/2002 |
| CN | 1098214 | C | 1/2003 |
| CN | 1388214 | A | 1/2003 |
| CN | 1388214 | A * | 1/2003 |
| CN | 1814707 | A | 8/2006 |
| CN | 1322924 | C | 6/2007 |
| CN | 1323133 | C | 6/2007 |
| CN | 100389177 | C | 5/2008 |
| FR | 2673550 | A1 * | 9/1992 |
| GB | 849184 | | 9/1960 |
| GB | 976941 | | 12/1964 |
| JP | 02-277548 | A | 11/1990 |
| JP | 08-173816 | | 7/1996 |
| WO | WO 9721785 | A1 * | 6/1997 |

OTHER PUBLICATIONS

Japanese Official Action dated Mar. 11, 2011 from related application JP 2007-522900 together with English language translation.

Guido Busca, "The surface of transitional aluminas: A critical review" Catalysis Today (2014) vol. 226, pp. 2-13 (available online Sep. 5, 2013).

* cited by examiner

CRACKING CATALYST AND A PROCESS FOR PREPARING THE SAME

FIELD OF THE INVENTION

The present invention relates to a cracking catalyst used in oil refining and a process for preparing the catalyst.

DESCRIPTION OF THE RELATED ART

The trend of catalytic cracking stocks becoming heavier and heavier is so increasingly severe that higher cracking ability of the cracking catalyst and cracking process has to be required in order to realize an object of production of more light oil (gasoline and diesel oil) and liquefied petroleum gas.

With regard to fluidized catalytic cracking (FCC) gasoline, olefins, aromatics and isoparaffins are main contributors of octane number. However, decreasing the olefin content of FCC gasoline is required due to environmental protection. In order to offset the loss of octane number caused by decreasing the olefin content, increasing the content of isoparaffins and aromatics in gasoline is required. Thus, there is a need of developing a cracking catalyst and a cracking process that are able to produce gasoline having lower content of olefin but higher content of aromatics and isoparaffins.

Meantime, the quality of catalytic cracking diesel oil needs also to be improved, because the diesel oil obtained by using the existing cracking catalyst and process has a lower aniline point, a higher density and a lower cetane number. Thus, there is a need of developing a cracking catalyst and a cracking process that have relatively high cracking ability of heavy oil and are able to decrease the density of diesel oil and increase aniline point and cetane number thereof.

Furthermore, light olefins and isobutane contained in the liquefied petroleum gas from a catalytic cracking are feedstocks of basic organic chemical industries. Currently, the supply of the light olefins (especially propylene) and isobutane falls short of demand. However, the content of light olefins (especially propylene) and isobutane is lower in the liquefied petroleum gas products from the existing cracking catalysts and processes. Thus, there is a need of developing a novel cracking catalyst and a cracking process that can be used to produce the cracking product containing more light olefins (especially propylene) and isobutane in the liquefied petroleum gas.

CN 1042201C discloses a cracking catalyst for the production of more $C_3$-$C_5$ olefins. The catalyst consists of 10-50 wt % of the zeolite-Y having a unit cell size ≤2.45 nm, 2-40 wt % of ZSM-5 zeolite modified with element selected from the group consisting of P, RE and H, and 20-80 wt % of a semisynthetic matrix of kaolin and alumina binder.

CN 1055301C discloses a cracking catalyst for the production of more iso-olefins and gasoline. The catalyst consists of 5-70 wt % of a composite aluminum-base alumina binder that is made up with pseudo-boehmite and alumina sol in a weight-ratio of from 1:9 to 9:1, 5-65 wt % of clay and 23-50 wt % of molecular sieve. Wherein said molecular sieve is a mixture consisting of 15-82 wt % of the zeolite-Y and the balance of a rare earth-containing pentasil high silica zeolite containing 0-10 wt % of phosphorus(measured as $P_2O_5$) and/or HZSM-5 zeolite.

CN 1072201A discloses a catalyst for the conversion of hydrocarbons to produce light olefins and gasoline with high octane number. The catalyst consists of 10-40 wt % of three zeolites i.e. zeolite ZSM-5, zeolite REY and a high silica zeolite-Y, and the balance of a synthetic matrix or a semisynthetic matrix containing 10-40 wt % of silica and/or alumina binder. Wherein the amount of the zeolite ZSM-5 is 3-50 wt %, and the amounts of the zeolite REY and the high silica zeolite-Y are each of 12-75 wt %.

CN1085825A discloses a catalyst for the conversion of hydrocarbons to produce-propylene, butene and gasoline with high octane number. The catalyst consists of 10-40 wt % of three zeolites i.e. zeolite ZRP, zeolite REY and high silica zeolite-Y, and the balance of a-synthetic matrix or a semisynthetic matrix containing 10-40 wt % of silica and/or alumina binder. Wherein the amount of the zeolite ZRP is 3-50 wt %, and the amounts of zeolite REY and the high silica zeolite-Y are each of 12-75 wt %.

CN 1325940A discloses a phosphorus-containing catalyst for cracking hydrocarbons. The catalyst consists of 10-60 wt % of a zeolite-Y or the zeolite-Y together with a MFI-structured zeolite and/or zeolite-β, 0-75 wt % of clay, 10-60 wt % of two kinds of alumina, and 0.1-7.0 wt % of phosphorus measured as $P_2O_5$, and 0-20 wt % of rare earth measured as $RE_2O_3$. Said two kinds of alumina are from pseudo-boehmite and alumina sol, respectively. Although the catalyst has higher ability for the conversion of heavy oil and makes the olefin content lower in gasoline product, the use of the catalyst cannot improve the quality of the catalytic cracked diesel oil and cannot increase the content of light olefins and isobutane in the liquefied petroleum gas.

CN 1354224A discloses a catalytic cracking catalyst for producing isoparaffins-rich gasoline, propylene and isobutane. The catalyst consists of 0-70 wt % of clay, 5-90 wt % of inorganic oxides and 1-50 wt % of molecular sieve, wherein the molecular sieve is a mixture including (1) 20-75 wt % of a high silica zeolite-Y having a $SiO_2/Al_2O_3$ ratio of 5-15 and a rare earth content of 8-20 wt % measured as $RE_2O_3$, (2) 20-75 wt % of a high silica zeolite-Y having a $SiO_2/Al_2O_3$ ratio of 16-50 and a rare earth content of 2-7 wt % measured as $RE_2O_3$, and (3) 1-50 wt % of zeolite-β or mordenite or zeolite-ZRP Alumina is a component included generally in cracking catalysts. In the prior art, alumina is mostly from alumina monohydrate and alumina sol, wherein alumina monohydrate includes boehmite and pseudo-boehmite. During calcination for preparing the catalyst, boehmite, pseudo-boehmite and alumina sol are converted all into γ-alumina. Therefore, the alumina contained in catalysts aforementioned in the prior art is all γ-alumina.

Alumina may be also from alumina trihydrate. Alumina trihydrate includes α-alumina trihydrate, β-alumina trihydrate (Bayerite) and-Nordstrandite. During the preparation of catalyst, α-alumina trihydrate is converted into χ-alumina, and β-alumina trihydrate is converted into η-alumina.-Nordstrandite is only existence in nature, but there is no way to obtain by artificial synthesis. CN 1388214A discloses a process for preparing fluid cracking catalysts by drying a mixture of cracking catalyst components including clay, alumina and molecular sieve, wherein said catalyst contains 1.5-55 wt % of alumina that is from β-alumina trihydrate. Although said catalyst has higher activity for cracking heavy oil and better selectivity for light oil, it is not able to decrease the olefin content of gasoline, nor is able to improve the quality of catalytic diesel oil and increase the content of light olefins and isobutane in the liquefied petroleum gas.

SUMMARY OF THE INVENTION

An object of the present invention is to provide a novel catalyst for cracking hydrocarbons. Said catalyst has higher ability for cracking heavy oil, and results in cracking products with lower olefin content of gasoline, higher quality of diesel oil, and higher contents of light olefins and isobutane of the liquefied petroleum gas.

Although there are some examples in the prior art wherein alumina trihydrate is introduced in the preparation of cracking catalyst, it is used simply to increase cracking ability of cracking catalyst without effect on quality of gasoline, diesel oil and liquefied petroleum gas in the cracking products. The inventor of the present invention has unexpectedly found that when the alumina formed with alumina trihydrate, especially β-alumina trihydrate, and phosphorus, i.e. η-alumina and phosphorus are introduced simultaneously into the cracking catalyst, a peculiar synergistic effect occurs that not only the cracking ability of the cracking catalyst can be increased, but also the quality of gasoline, diesel oil and liquefied petroleum gas can be substantially improved in the cracking products.

The catalyst according to the present invention contains alumina, phosphorus and molecular sieve, with or without clay, wherein said alumina is η-alumina or a mixture of η-alumina and χ-alumina and/or γ-alumina. The catalyst contains, on the basis of total amount of the catalyst, 0.5-50 wt % of η-alumina, 0-50 wt % of χ-alumina and/or γ-alumina, 10-70 wt % of the molecular sieve, 0-75 wt % of clay, and 0.1-8 wt % of phosphorus, measured as $P_2O_5$.

Said molecular sieve is one or more selected from the group consisting of zeolite and non-zeolitic molecular sieve as an active component of the cracking catalyst. These zeolite and non-zeolitic molecular sieve are well known for one skilled in the art.

Said zeolite is preferably one or more selected from large pore zeolite and medium pore zeolite.

Said large pore zeolite is one having a porous structure with ring open-pore in diameter of at least 0.7 nanometers(nm), such as one or more selected from the group consisting of faujasite, zeolite-β and mordenite, especially a zeolite-Y, the zeolite-Y containing one or more elements selected from phosphorus, iron and rare earths, an ultrastable zeolite-Y, the ultrastable zeolite containing one or more elements selected from phosphorus, iron and rare earths, and zeolite-β.

Said medium pore zeolite is one having a porous structure with ring open-pore in diameter of from higher than 0.56 nm to less than 0.7 nm, such as one or more selected from a MFI-structured zeolite (e.g. ZSM-5 zeolite), the MFI-structured zeolite containing one or more elements selected from phosphorus, iron and rare earths (e.g. ZSM-5 zeolite containing phosphorus, iron and/or rare earths, and the MFI-structured zeolite containing phosphorus disclosed in CN 1194181 A).

Said non-zeolitic molecular sieve refers to one or more molecular sieve in which part of or all aluminum and/or silicon are substituted by other elements such as phosphorus, titanium, gallium and germanium. Examples of these molecular sieves include one or more selected from silicates having different $SiO_2/Al_2O_3$ ratio (e.g. metallosilicate, titanosilicates), metalloaluminate (e.g. germanium aluminates), metallophosphates, aluminophosphates, metalloaluminophosphates, metal integrated silicoaluminophosphates (MeAPSO and ELAPSO), silicoaluminophosphates (SAPO molecular sieve), and gallogermanates. SAPO molecular sieve is preferred, such as one or more selected from the group consisting of SAPO-11 molecular sieve, SAPO-34 molecular sieve and SAPO-37 molecular sieve.

Preferably, said molecular sieve is one or more selected from the group consisting of a zeolite-Y, the zeolite-Y containing phosphorus, iron and/or rare earths, an ultrastable zeolite-Y, the ultrastable zeolite-Y containing phosphorus, iron and/or rare earths, zeolite-β, the MFI-structured zeolite, the MFI structured zeolite containing phosphorus, iron and/or rare earths, and SAPO molecular sieve.

More preferred molecular sieve is a zeolite mixture containing the zeolite-Y and the MFI-structured zeolite, the content of the zeolite-Y is 30-90 wt %, the content of the MFI-structured zeolite is 10-70 wt %, based on the total amount of said zeolite mixture.

Preferred catalyst includes further 0.1-2 wt % of rare earth metal (measured as oxide).

The process for preparing the catalyst according to the present invention comprises drying the slurry containing aluminum compound, molecular sieve and water, with or without clay, wherein said aluminum compound is one that is able to form η-alumina, or a mixture of an aluminum compound able to form η-alumina and an aluminum compound able to form χ-alumina and/or γ-alumina, and then calcining the slurry followed adding further a phosphorus compound. Each component is used in such an amount that the final catalyst contains, based on the total amount of the catalyst, 0.5-50 wt % of η-alumina, 0-50 wt % of χ-alumina and/or γ-alumina, 10-70 wt % of molecular sieve, 0-75 wt % of clay and 0.1-8 wt % of phosphorus, measured as $P_2O_5$.

The catalyst according to the present invention not only has higher cracking activity, but also substantially improves the quality of gasoline, diesel oil and liquefied petroleum gas, as showed that the gasoline has a lower content of olefins, a higher content of aromatics and isoparaffins, that the diesel oil has a lower density and a higher cetane number, and that the liquefied petroleum gas has a higher content of light olefins, especially the content of propylene and isobutane. The catalyst has further advantages such as high ability for cracking heavy oil, and capability of producing more light oils (gasoline and diesel oil) and the liquefied petroleum gas.

DETAILED DESCRIPTION OF THE INVENTION

The catalyst provided according to the process of the present invention contains alumina, phosphorus and molecular sieve, with or without clay, wherein said alumina is η-alumina or a mixture of η-alumina and χ-alumina and/or γ-alumina, and wherein the catalyst contains, based on the total amount of the catalyst, 0.5-50 wt %, preferably 5-45 wt % of η-alumina, 0-50 wt %, preferably 0-40 wt % of χ-alumina and/or γ-alumina, 10-70 wt %, preferably 20-50 wt % of molecular sieve, 0-75 wt %, preferably 0-60 wt % of clay and 0.1-8 wt %, preferably 0.5-6 wt % of phosphorus, measured as $P_2O_5$.

(The catalyst according to the present invention may further contain 0.1-2 wt %, preferably 0.2-1.8 wt % of rare earth metal (measured as oxide).

Said molecular sieve is one or more selected from the group consisting of zeolite and non-zeolitic molecular sieve that they are used as active component of cracking catalyst. These zeolite and non-zeolitic molecular sieve are well known for one skilled in the art.

Said zeolite is preferably one or more selected from large pore zeolite and medium pore zeolite.

Said large pore zeolite is a zeolite having a porous structure with ring open-pore in diameter at least 0.7 nm, such as one or more selected from faujasite, zeolite-β and mordenite, especially, one or more selected from a zeolite-Y, the zeolite-Y containing one or more elements selected from phosphorus, iron and rare earth, an ultrastable zeolite-Y, the ultrastable zeolite containing one or more selected from phosphorus, iron and rare earths, a zeolite-HY, the zeolite-HY containing one or more elements selected from phosphorus, iron and rare earths, and zeolite-β.

Said medium pore zeolite is a porous structure zeolite having ring open-pore of from higher than 0.56 nm to less than 0.7 nm, such as the MFI-structured zeolite (e.g. ZSM-5 zeolite), the MFI-structured zeolite containing one or more elements selected from phosphorus, iron and rare earths (such as ZSM-5 zeolite containing one or more elements selected from phosphorus, iron and/or rare earths, and MFI-structured zeolite containing phosphorus, as disclosed in CN 1194181 A).

Said non-zeolitic molecular sieve refers to one or more molecular sieve in which part of or all aluminum and/or silicon are substituted by other elements such as phosphorus, titanium, gallium and germanium. Examples of these molecular sieves include one or more selected from silicates having different $SiO_2/Al_2O_3$ ratio (e.g. metallosilicate, titanosilicates), metalloaluminate (e.g. germanium aluminates), metallophosphates, aluminophosphates, metalloaluminophosphates, metal integrated silicoaluminophosphates (MeAPSO and ELAPSO), silicoaluminophosphates (SAPO molecular sieve), and gallogermanates. SAPO molecular sieve is preferred, such as one or more selected from the group consisting of SAPO-11 molecular sieve, SAPO-34 molecular sieve and SAPO-37 molecular sieve.

Preferably, said molecular sieve is one or more selected from the group consisting of a zeolite-Y, the zeolite-Y containing one or more selected from phosphorus, iron and/or rare earths, an ultrastable zeolite-Y, the ultrastable zeolite-Y containing one or more selected from phosphorus, iron and/or rare earths, a zeolite-HY, the zeolite-HY containing one or more selected from phosphorus, iron and rare earths, zeolite-β, a MFI-structured zeolite, the MFI-structured zeolite containing one or more selected from phosphorus, iron and rare earths, and SAPO molecular sieve.

More preferred molecular sieve contains a zeolite mixture of a zeolite-Y and the MFI-structured zeolite, wherein the content of the zeolite-Y is 30-90 wt %, preferably 40-85 wt %, and the content of the MFI-structured zeolite is 10-70 wt %, preferably 15-60 wt %, based on the total amount of said zeolite mixture.

Said clay is one or more selected from clays that are used as active component of cracking catalyst, such as one or more selected from kaolin, halloysite, montmorillonite, kieselguhr, allokite, soapstone, rectorite, sepiolite, attapulgus, hydrotalcite, and bentonite. More preferred clay is one or more selected from kaolin, montmorillonite, kieselguhr, rectorite, sepiolite and attapulgus. These clays are well known for one skilled in the art.

The catalyst according to the present invention may further contain non-alumina refractory inorganic oxide. Said non-alumina refractory inorganic oxide is one or more selected from the group consisting of non-alumina refractory inorganic oxides that are used as matrix of cracking catalyst, such as silica, amorphous silica-alumina, zirconia, titania, boric oxide, oxides of alkaline earth metal. Preferably, it is one or more selected from the group consisting of silica, amorphous silica-alumina, zirconia, titania, magnesia oxide and calcium oxide. The refractory inorganic oxides are well known for one skilled in the art. Based on the total amount of catalyst, the content of said non-alumina refractory inorganic oxide is 0-10 wt %, preferably 0-5 wt %.

In the process for preparing the catalyst according to the present invention, said aluminum compound is one able to form η-alumina, or a mixture of an aluminum compound able to form η-alumina and an aluminum compound able to form χ-alumina and/or γ-alumina.

Said aluminum compound able to form η-alumina may be any aluminum compound that is able to form η-alumina during the preparation of catalyst, preferably β-alumina trihydrate. Said aluminum compound able to form χ-alumina may be any aluminum compound that is able to form χ-alumina during the preparation of catalyst, preferably α-alumina trihydrate. Said aluminum compound able to form γ-alumina may be any aluminum compound that is able to form γ-alumina during the preparation of catalyst, preferably boehmite, pseudo-boehmite and/or alumina sol.

Said phosphorus compound may be added in any step before calcining, for example, it may be added to a slurry containing the aluminum compound, molecular sieve and water, with or without clay. Or the phosphorus compound may be introduced by impregnating the solids obtained after drying the slurry containing the aluminum compound, molecular sieve and water, with or without clay, then calcining the impregnated product. In the catalyst of the present invention, said phosphorus content is exclusive of phosphorus contained originally in the molecular sieve.

Said phosphorus compound includes various compounds of phosphorus, for example, one or more selected from the group consisting of phosphoric acid, phosphates, phosphorous acid, phosphites, pyrophosphoric acid, pyrophosphates, polyphosphoric acids, polyphosphates, metaphosphoric acid and metaphosphates. Preferably, it is one or more selected from the group consisting of phosphoric acid, ammonium phosphate, diammonium hydrogen phosphate, ammonium dihydrogen phosphate, phosphorous acid, ammonium phosphite, sodium pyrophosphate, potassium pyrophosphate, sodium tripolyphosphate, potassium tripolyphosphate, sodium hexametaphosphate, potassium hexametaphosphate. More preferably, it is one or more selected from the group consisting of phosphoric acid, ammonium phosphate, diammonium hydrogen phosphate, ammonium dihydrogen phosphate, phosphorous acid, ammonium phosphite, sodium pyrophosphate, sodium tripolyphosphate, sodium hexametaphosphate.

Each component is used in such an amount that the final catalyst contains, based on the total amount of the catalyst, 0.5-50 wt η-alumina, 0-50 wt % of χ-alumina and/or γ-alumina, 10-70 wt % of molecular sieve, 0-75 wt % of clay, and 0.1-8 wt % of phosphorus, measured as $P_2O_5$. Preferably, each component is used in such an amount that the final catalyst contains 5-45 wt % of η-alumina, 0-40 wt % of χ-alumina and/or γ-alumina, 20-50 wt % of molecular sieve, 0-60 wt % of clay, and 0.5-6 wt % of phosphorus, measured as $P_2O_5$.

If the catalyst further contains non-alumina inorganic oxides, the non-alumina inorganic oxide or its precursor may be added to the slurry containing the aluminum compound, molecular sieve and water, with or without clay. The precursor of said non-alumina inorganic oxide refers to a substance that is able to form said non-alumina inorganic oxide during the preparation of the catalyst, these precursors of non-aluminum inorganic oxides are well known for one skilled in the art. For example, the precursor of silica may be silica sol, silica gel and/or sodium silicate; the precursor of amorphous silica-alumina may be a silica-alumina sol and/or silica-alumina gel, and the precursor of zirconia, titania, boric oxide and alkaline earth metal oxides may be respective hydroxide thereof. Said non-alumina inorganic oxide and/or its precursor is used in such an amount that the final catalyst contains 0-10 wt %, preferably 0-5 wt % of the non-alumina inorganic oxide.

Conditions of said drying and calcining are those of conventional drying and calcination for cracking catalysts, for example, the drying temperature is from room temperature to 200° C., preferably 80-180° C., and the calcination temperature is from higher than 200° C. to 750° C., preferably 300-600° C., the calcination time is at least 0.1 hrs, preferably 0.1-10 hrs, more preferably 0.3-4 hrs. As drying method, various existing methods for drying may be used, such as oven-drying, air-drying or spray-drying, preferably oven-drying or spray-drying.

The catalyst according to the present invention is suitable for catalytic cracking of petroleum and its various fractions, especially suitable for catalytic cracking of petroleum and its various fractions having a boiling point higher than 330° C., such as one or more selected from atmospheric residuum, vacuum residuum, vacuum gas oil, atmospheric gas oil, straight-run gas oil, light or heavy deasphalted oils from the process of solvent deasphalting, and coker gas oil, in order to produce high-quality of gasoline, diesel oil and liquefied petroleum gas.

One of Preferred Catalysts in the Present Invention

The catalyst contains alumina, phosphorus and molecular sieve, with or without clay. Said alumina is η-alumina, or a mixture of η-alumina and χ-alumina and/or γ-alumina. The catalyst contains, based on the total amount of the catalyst, 0.5-50 wt %, preferably 5-45 wt % of η-alumina, 0-50 wt %, preferably 0-40 wt % of χ-alumina and/or γ-alumina, 0-75 wt %, preferably 0-60 wt % of clay, 0.1-8 wt %, preferably 0.5-6 wt % of phosphorus, measured as $P_2O_5$, and 10-70 wt %, preferably 20-50 wt % of molecular sieve. Said molecular sieve is a zeolite mixture containing the zeolite-Y and the MFI-structured zeolite, wherein the content of the zeolite-Y is 30-90 wt %, preferably 40-85 wt % and the content of the MFI-structured zeolite is 10-70 wt %, preferably 15-60 wt %, based on the total amount of said zeolite mixture.

The process for preparing the preferred catalyst is as follows:

The process comprises drying the slurry containing aluminum compound, molecular sieve and water, with or without clay, wherein said aluminum compound is one that is able to form η-alumina, or a mixture of an aluminum compound able to form η-alumina and an aluminum compound able to form χ-alumina and/or γ-alumina, and then calcining the slurry followed adding further a phosphorus compound. Each component is used in such an amount that the final catalyst contains, based on the total amount of the catalyst, 0.5-50 wt %, preferably 5-45 wt % of η-alumina, 0-50 wt %, preferably 0-40 wt % of χ-alumina and/or γ-alumina, 0-75 wt %, preferably 0-60 wt % of clay, 0.1-8 wt %, preferably 0.5-6 wt % of phosphorus, measured as $P_2O_5$, and 10-70 wt %, preferably 20-50 wt % of molecular sieve. Said molecular sieve is a zeolite mixture containing the zeolite-Y and the MFI-structured zeolite, wherein the content of the zeolite-Y is 30-90 wt %, preferably 40-85 wt % and the content of the MFI-structured zeolite is 10-70 wt %, preferably 15-60 wt %, based on the total amount of said zeolite mixture.

Said zeolite mixture further contains zeolite-β of which the content is 0-30 wt %, preferably 0-20 wt %, based on the total amount of said zeolite mixture.

The catalyst substantially improves the quality of gasoline and liquefied petroleum gas in cracking products.

The Second of Preferred Catalysts According to the Present Invention

The catalyst contains alumina, phosphorus, rare earth metal and molecular sieve, with or without clay. Said alumina is η-alumina or a mixture of η-alumina and χ-alumina and/or γ-alumina. The catalyst contains, based on the total amount of the catalyst, 0.5-50 wt %, preferably 5-45 wt % of η-alumina, 0-50 wt %, preferably 0-40 wt % of χ-alumina and/or γ-alumina, 0-70 wt %, preferably 0-60 wt % of clay, 0.1-8 wt %, preferably 0.5-6 wt % of phosphorus, measured as $P_2O_5$, 0.1-2 wt %, preferably 0.2-1.8 wt % of rare earth metal, measured as oxide, and 10-70 wt %, preferably 20-50 wt % of the molecular sieve. Said molecular sieve molecular sieve is zeolite-Y.

The process for preparing the preferred catalyst as follows:

The process comprises drying the slurry containing aluminum compound, molecular sieve and water, with or without clay, wherein said aluminum compound is one that is able to form η-alumina, or a mixture of an aluminum compound able to form η-alumina and an aluminum compound able to form χ-alumina and/or γ-alumina, and then calcining the slurry followed adding further a phosphorus compound and a rare earth metal compound. Each component is used in such an amount that the final catalyst contains, based on the total amount of the catalyst, 0.5-50 wt %, preferably 5-45 wt % of η-alumina, 0-50 wt %, preferably 0-40 wt % of χ-alumina and/or γ-alumina, 0-70 wt %, preferably 0-60 wt % of clay, 0.1-8 wt %, preferably 0.5-6 wt % of phosphorus, measured as $P_2O_5$, 0.1-2 wt %, preferably 0.2-1.8 wt % of rare earth metal, measured as oxide, and 10-70 wt %, preferably 20-50 wt % of the molecular sieve. Said molecular sieve molecular sieve is zeolite-Y.

Said rare earth metal compound is one or more selected from the group consisting of rare earth metal chloride and rare earth metal nitrate.

The catalyst has high ability for cracking heavy oil, and thereby can be used to produce more light oils (gasoline and diesel oil) and liquefied petroleum gas.

Conditions for using the catalyst according to the present invention are those conventional for cracking reaction. Generally, said cracking conditions include a reaction temperature of 350-700° C., preferably 400-650° C., a catalyst-oil ratio (a weight-ratio of catalyst to hydrocarbon oil) of 1-20, preferably 2-15.

Following Examples intend to illustrate further the present invention.

In Examples, the alumina content of β-alumina trihydrate used is 64 wt % (the trihydrate is manufactured by Institute of ShanDong Aluminum Corp.); the alumina content of pseudo-boehmite (manufactured by ShanDong Aluminum Corp) is 62 wt %; the alumina content of alumina sol (manufactured by Qilu Catalyst Factory) is 21.6 wt %, the silica content of silica sol (manufactured by Beijing Changhong Chemical Plant) is 12 wt %: the solid content of kaolin (manufactured by China Kaolin Corp) is 76 wt %; the solid content of montmorillonite (manufactured by Hubei Zhongxiang City Iron Ore Factory) is 80 wt %; the phosphorus-containing compound is of chemical purity; the solution of rare earth chloride (prepared in the laboratory, with a concentration of 219 g rare earth oxide/litre, in which $La_2O_3$ accounts for 53.2% of the rare earth oxide, $CeO_2$ accounts for 13.0% of the rare earth oxide, $Pr_6O_{11}$ accounts for 13.0% of the rare earth oxide, $Nd_2O_3$ accounts for 20.8% of the rare earth oxide; the solid rare earth chloride is manufactured by Inner Mongolia Baotou Rare earth Factory).

In Examples, molecular sieve SAPO-11 was prepared according to the process disclosed in Example 1 of CN 1098214C.

In Examples, compositions of various zeolites used are as follows respectively:

Zeolite HY (with a $Na_2O$ content of 1.5 wt % and a $SiO_2/Al_2O_3$ ratio of 5.3) is obtained by ion-exchanging a zeolite NaY (with a $Na_2O$ content of 13.5 wt % and a $SiO_2/Al_2O_3$ ratio of 5.0, manufactured by Qilu Catalyst Factory) at a temperature of 80° C. for 1 hr in a weight ratio of water:zeolite NaY:solid ammonium chloride of 10:1:1, then filtering and calcining at 550° C. for 2 hrs, and then exchanging once again by repeating aforementioned steps, then filtering and calcining;

Zeolite REY is a zeolite-Y containing rare earths (the content of rare earth oxide is 18.5 wt %, in which $La_2O_3$ accounts for 53.2 wt % of the rare earth oxide, $CeO_2$ accounts for 13.0 wt % of the rare earth oxide, $Pr_6O_{11}$ accounts for 13.0 wt % of the rare earth oxide, $Nd_2O_3$ accounts for 20.8 wt % of the rare earth oxide, $Na_2O$ content is 1.6 wt %; the $SiO_2/Al_2O_3$ ratio is 5.4, the unit cell size is 2.468 nm, the zeolite is manufactured by Qilu Catalyst Factory);

Zeolite REHY is a zeolite-Y containing rare earths (the content of rare earth oxide is 84 wt %, in which $La_2O_3$ accounts for 53.2 wt % of the rare earth oxide, $CeO_2$ accounts for 13.0 wt % of the rare earth oxide, $Pr_6O_{11}$ accounts for 13.0 wt % of the rare earth oxide, $Nd_2O_3$ accounts for 20.8 wt % of the rare earth oxide, $Na_2O$ content is 3.7 wt %; the $SiO_2/Al_2O_3$ ratio is 5.6, the unit cell size is 2.461 nm, the zeolite is manufactured by Qilu Catalyst Factory);

Zeolite MOY is a zeolite-Y containing phosphorus and rare earths (the content of rare earth oxide is 8.0 wt %, in which $La_2O_3$ accounts for 53.2 wt % of the rare earth oxide, $CeO_2$ accounts for 13.0 wt % of the rare earth oxide, $Pr_6O_{11}$ accounts for 13.0 wt % of the rare earth oxide, $Nd_2O_3$ accounts for 20.8 wt % of the rare earth oxide, $Na_2O$ content is 1.3 wt %; the phosphorus content is 1.1 wt %, measured as elemental phosphorus, the $SiO_2/Al_2O_3$ ratio is 5.6, the unit cell size is 2.460 nm, the zeolite is manufactured by Qilu Catalyst Factory);

Zeolite $DASY_{0.0}$ is an ultrastable zeolite-Y ($Na_2O$ content is 1.0 wt %, the $SiO_2/A_2O_3$ ratio is 6.8, the unit cell size is 2.446 nm, the zeolite is manufactured by Qilu Catalyst Factory);

Zeolite $DASY_{0.0}$ is an ultrastable zeolite-Y containing rare earths (the content of rare earth oxide is 1.8 wt %, in which $La_2O_3$ accounts for 53.2 wt % of the rare earth oxide, $CeO_2$ accounts for 13.0 wt % of the rare earth oxide, $Pr_6O_{11}$ accounts for 13.0 wt % of the rare earth oxide, $Nd_2O_3$ accounts for 20.8 wt % of the rare earth oxide, $Na_2O$ content is 1.2 wt %; the $SiO_2/Al_2O_3$ ratio is 6.8, the unit cell size is 2.447 nm, the zeolite is manufactured by Qilu Catalyst Factory);

Zeolite ZSM-5 is a MFI-structured zeolite ($Na_2O$ content is 0.2 wt %, the $SiO_2/Al_2O_3$ ratio is 60, the zeolite is manufactured by Qilu Catalyst Factory);

Zeolite ZRP-1 is a MFI-structured zeolite containing phosphorus and rare earths (having $Na_2O$ content of 0.1 wt %, a $SiO_2/Al_2O_3$ ratio of 30 and a rare earth oxide content of 1.7 wt %, in which $La_2O_3$ accounts for 53.2 wt % of the rare earth oxide, $CeO_2$ accounts for 13.0 wt % of the rare earth oxide, $Pr_6O_{11}$ accounts for 13.0 wt % of the rare earth oxide, $Nd_2O_3$ accounts for 20.8 wt % of the rare earth oxide, the phosphorus content is 1.9 wt %, measured as elemental phosphorus, the zeolite is manufactured by Qilu Catalyst Factory);

ZSP-1 is a MFI-structured zeolite containing phosphorus and iron ($Na_2O$ content is 0.1 wt %; the $SiO_2/Al_2O_3$ ratio is 30, $Fe_2O_3$ content is 1.5 wt %, and the phosphorus content is 1.2 wt %, measured as elemental phosphorus, the zeolite is manufactured by Qilu Catalyst Factory);

Zeolite-β has a $Na_2O$ content of 3.2 wt % and a $SiO_2/Al_2O_3$ ratio of 28, the zeolite is manufactured by Qilu Catalyst Factory.

Aforesaid $SiO_2/Al_2O_3$ ratios all refers to the molar ratio of silica and alumina.

EXAMPLES 1-6

Following examples illustrate the catalysts according to the present invention and the process for preparing the same.

Catalysts C1-C6 according to the present invention were obtained by mixing and slurrying β-alumina trihydrate or a mixture of β-alumina trihydrate and pseudo-boehmite, molecular sieve, phosphorus compound and water (with or without clay), spray-drying the resulting slurry into particles of 40-150 microns in diameter, then calcining the resulting particles. The amount of the β-alumina trihydrate and pseudo-boehmite used, the kind and amount of clay used, and the kind and amount of the molecular sieve used, the kind and amount of the phosphorus compound used are shown respectively in Tables 1-4. The spray-drying temperature, calcination temperature and time are shown in Table 5. The compositions of catalysts C1-C6 are shown in Table 6.

COMPARATIVE EXAMPLE 1

This comparative example illustrates the reference catalyst having no phosphorus added and the process for preparing the reference catalyst The reference catalyst CB1 was prepared by the same process as Example 1, except that no phosphorus compound was added and different amount of clay was used. The amount of the β-alumina trihydrate and pseudo-boehmite used, the kind and amount of the clay used, and the kind and amount of the molecular sieve used are shown respectively in Tables 1-4. The spray-drying temperature, calcination temperature and time are shown in Table 5. The composition of the reference catalyst CB1 is shown in Table 6.

COMPARATIVE EXAMPLE 2

This comparative example illustrates the reference catalyst containing no η-alumina and the process for preparing the reference catalyst.

The reference catalyst CB2 was obtained by the same process as Example 1, except that pseudo-boehmite was used instead of β-alumina trihydrate. The amount of the pseudo-boehmite used, the kind and amount of the clay used, the kind and amount of the molecular sieve used, and the kind and amount of the phosphorus compound used are shown respectively in Tables 1-4. The spray-drying temperature, calcination temperature and time are shown in Table 5. The composition of the reference catalyst C B2 is shown in Table 6.

EXAMPLE 7

This Example illustrates the catalyst according to present invention and the process for preparing the same.

The catalyst C 7 was obtained by mixing and slurrying 93.8 kg β-alumina trihydrate, 72.6 kg pseudo-boehmite, 54 kg $DASY_{2.0}$ molecular sieve, 30 kg ZRP-1 molecular sieve, 6 kg SAPO-11 molecular sieve, 126.3 kg kaolin and 50 kg silica sol and deionized water, spray-drying the resulting slurry at temperature 180° C. into particles of 40-150 microns in diameter, impregnating 300 kg (the weight on dry basis) the dried solids with 303.8 kg aqueous solution of 1.6 wt % ammonium dihydrogen phosphate, and then calcining the resulting solids at a temperature of 500° C. for 2 hrs. The composition of catalyst C7 is shown in Table 6.

EXAMPLE 8

This Example illustrates the catalyst according to the present invention and the process for preparing the same.

The catalyst C8 according to the present invention was obtained by the same process as Example 6, except that 69.4 kg alumina sol were used instead of said pseudo-boehmite. The composition of the catalyst C8 is shown in Table 6.

TABLE 1

| Example No. | Amount of the β-alumina trihydrate used, kg | Amount of the pseudo-boehmite/ alumina sol used, kg |
|---|---|---|
| 1 | 61.7 | — |
| Comp. Exp. 1 | 61.7 | — |
| Comp. Exp. 2 | — | 63.7 |
| 2 | 8.6 | 41.1 |
| 3 | 56.3 | 35.5 |
| 4 | 68.8 | 37.7 |
| 5 | 4.7 | 3.2 |
| 6 | 39.1 | 24.2 |

TABLE 2

| Example No. | Kinds of molecular sieve | Amount of the molecular sieve used, kg |
|---|---|---|
| 1 | REHY | 26 |
| Comp. Exp. 1 | REHY | 26 |
| Comp. Exp. 2 | REHY | 26 |
| 2 | $DASY_{0.0}$ + ZSP-1 | 39 + 10 |
| 3 | HY + ZSM-5 | 17 + 23 |
| 4 | REY + β | 14 + 8 |
| 5 | MOY + $DASY_{2.0}$ + ZRP-1 | 15 + 19 + 7 |
| 6 | MOY + ZSM-5 | 25 + 10 |

TABLE 3

| Example No. | Kinds of clay | Amount of the clay used, kg |
|---|---|---|
| 1 | Kaolin | 42.1 |
| Comp. Exp. 1 | Kaolin | 45.4 |
| Comp. Exp. 2 | Kaolin | 42.1 |
| 2 | Kaolin | 19.1 |
| 3 | — | — |
| 4 | Montmorillonite | 12.5 |
| 5 | Kaolin | 67.1 |
| 6 | Kaolin | 31.6 |

TABLE 4

| Example No. | Kinds of phosphorus compound | Amount of the phosphorus compound used, kg |
|---|---|---|
| 1 | Diammonium hydrogen phosphate | 4.7 |
| Comp. Exp. 1 | — | — |
| Comp. Exp. 2 | Diammonium hydrogen phosphate | 4.7 |
| 2 | Sodium hexametaphosphate | 7.9 |
| 3 | Ammonium phosphate | 4.2 |
| 4 | Ammonium phosphate | 1.3 |
| 5 | Ammonium dihydrogen phosphate | 4.9 |
| 6 | Ammonium dihydrogen phosphate | 1.6 |

TABLE 5

| Example No. | Drying temperature, °C. | Calcination temperature, °C. | Calcination time, hrs |
|---|---|---|---|
| 1 | 110 | 500 | 1 |
| Comp. Exp. 1 | 110 | 500 | 1 |
| Comp. Exp. 2 | 110 | 500 | 1 |
| 2 | 120 | 350 | 3.5 |
| 3 | 120 | 600 | 0.5 |
| 4 | 120 | 450 | 0.8 |
| 5 | 160 | 550 | 1.5 |
| 6 | 90 | 550 | 1.5 |

TABLE 6

| Example No. | Catalyst No. | η-alumina, wt % | γ-alumina, wt % | Molecular sieve, wt % | Clay, wt % | $P_2O_5$, wt % |
|---|---|---|---|---|---|---|
| 1 | C1 | 39.5 | 0 | 26.0 | 32.0 | 2.5 |
| Comp. Exp. 1 | CB1 | 39.5 | 0 | 26.0 | 34.5 | 0 |
| Comp. Exp. 2 | CB2 | 0 | 39.5 | 26.0 | 32.0 | 2.5 |
| 2 | C2 | 5.5 | 25.5 | 49.0 | 14.5 | 5.5 |
| 3 | C3 | 36.0 | 22.0 | 40.0 | 0 | 2.0 |
| 4 | C4 | 44.0 | 23.4 | 22.0 | 10.0 | 0.6 |
| 5 | C5 | 3.0 | 2.0 | 41.0 | 51.0 | 3.0 |
| 6 | C6 | 25.0 | 15.0 | 35.0 | 24.0 | 1.0 |
| 7 | C7 | 20.0 | 15.0/2.0* | 30.0 | 32.0 | 1.0 |
| 8 | C8 | 25.0 | 15.0 | 35.0 | 24.0 | 1.0 |

Note:
*2.0 wt % is the content of silica.

EXAMPLES 9-14

Following Examples illustrate the catalytic performances of the catalysts provided in the present invention.

The catalysts C1-C6 were aged with 100% steam at 800° C. for 8 hrs, respectively. The catalytic cracking of 1# feedstock oil as shown in Table 7 was carried out in an ACE unit with 9 g of inventory of each aged catalysts C1-C6. Reaction conditions and reaction results are shown in Table 8.

Wherein, Conversion=Dry gas yield+Liquefied petroleum gas yield+Gasoline yield+Coke yield; Total liquid products yield=Liquefied petroleum gas yield+Gasoline yield+Diesel oil yield. Herein, gasoline refers to a $C_5$ fraction to a fraction with a distillation temperature of 221° C. Diesel oil(LCO) refers to a fraction with a boiling point of from 221° C. to 343° C. Liquefied petroleum gas (LPG) refers to a $C_3$-$C_4$ fraction. Dry gas is a fraction of $H_2$-$C_2$.

COMPARATIVE EXAMPLES 3-4

Following comparative examples illustrate the catalytic performance of reference catalysts.

With the same process as Example 9, the catalysts were aged, and the catalytic cracking of the same feedstock oil was carried out under the same condition, except that the catalyst used was the reference catalysts CB1 and CB2 prepared in Comparative Example 1 and Comparative Example 2, respectively. Reaction conditions and reaction results are shown in Table 8.

TABLE 7

| 1# feedstock oil | The mixture of a vacuum gas oil and a vacuum residuum |
|---|---|
| Density (at 20° C.), g/cm$^3$ | 0.9044 |
| Refractive index (at 20° C.) | 1.5217 |
| Viscosity (at 100° C.), mm$^2$/sec | 9.96 |
| Condensed point, ° C. | 40 |
| Aniline point, ° C. | 95.8 |
| Element composition, wt % | |
| C | 85.98 |
| H | 12.86 |
| S | 0.55 |
| N | 0.18 |
| CCR, wt % | 3.0 |
| Boiling range, ° C. | |
| Initial point, | 243 |
| 5% | 294 |
| 10% | 316 |
| 30% | 395 |
| 50% | 429 |
| 70% | 473 |
| 90% | — |

TABLE 8

| | Example No. | | | | | | | |
|---|---|---|---|---|---|---|---|---|
| | 9 | Comp. 3 | Comp. 4 | 10 | 11 | 12 | 13 | 14 |
| Catalyst No. | C1 | CB1 | CB2 | C2 | C3 | C4 | C5 | C6 |
| Reaction temperature, ° C. | 510 | 510 | 510 | 460 | 550 | 500 | 480 | 510 |
| C/O | 4.0 | 4.0 | 4.0 | 4.5 | 3.5 | 5 | 6 | 4 |
| WHSV, hr$^{-1}$ | 16.0 | 16.0 | 16.0 | 15.5 | 18.2 | 14.3 | 12.0 | 16.2 |
| Conversion, wt % | 72.6 | 70.3 | 69.8 | 78.6 | 74.8 | 72.9 | 77.6 | 75.4 |
| Total liquid products yield, wt % | 79.9 | 74.0 | 70.9 | 85.6 | 80.1 | 78.9 | 84.4 | 80.9 |
| Product yields, wt % | | | | | | | | |
| Dry gas | 1.7 | 2.2 | 3.4 | 1.7 | 2.2 | 1.9 | 1.9 | 1.9 |
| LPG | 18.4 | 17.3 | 16.6 | 25.4 | 32.0 | 23.4 | 21.1 | 23.8 |
| Gasoline | 47.1 | 42.8 | 41.0 | 45.1 | 35.5 | 41.3 | 48.3 | 43.9 |
| LCO | 14.4 | 13.9 | 13.3 | 15.1 | 12.6 | 14.2 | 15.0 | 13.2 |
| Coke | 5.4 | 8.0 | 8.8 | 6.4 | 5.1 | 6.3 | 6.3 | 5.8 |
| Bottoms | 13.0 | 15.8 | 16.9 | 6.3 | 13.6 | 12.9 | 7.4 | 11.4 |
| Composition of gasoline, wt % | | | | | | | | |
| Olefins | 34.0 | 36.1 | 37.0 | 28.8 | 31.3 | 34.8 | 29.4 | 30.0 |
| Aromatics | 24.8 | 23.2 | 21.1 | 28.6 | 24.3 | 26.3 | 27.9 | 27.4 |
| Isoparaffins | 25.2 | 23.5 | 22.2 | 28.9 | 26.5 | 24.1 | 28.3 | 27.6 |
| Properties of LCO | | | | | | | | |
| Density, (at 20° C.) g/cm$^3$ | 905 | 928 | 935 | 890 | 915 | 920 | 896 | 902 |
| Aniline point, ° C. | 31.2 | 25.4 | 18.0 | 41.7 | 29.2 | 28.2 | 41.0 | 32.4 |
| Cetane number | 33.4 | 28.0 | 27.0 | 36.0 | 33.2 | 32.2 | 35.5 | 33.9 |
| Properties of LPG | | | | | | | | |
| Propylene content, wt % | 6.5 | 5.8 | 5.4 | 9.2 | 12.8 | 8.5 | 7.3 | 7.6 |
| Butene content, wt % | 6.0 | 5.6 | 5.3 | 9.6 | 13.5 | 9.1 | 7.6 | 8.0 |
| Isobutane content, wt % | 4.4 | 4.0 | 3.9 | 5.0 | 4.2 | 4.3 | 4.2 | 4.5 |

EXAMPLES 15-16

Following Examples illustrate the catalytic performances of the catalysts provided in the present invention.

The catalysts C7-C8 were aged at 800° C. with 100% steam for 17 hrs, respectively. The catalytic cracking of 2# feedstock oil as shown in Table 9 was carried out in a bench scale FFB unit with 90 g of-each aged catalysts C7-C8. Reaction conditions and reaction results are shown in Table 10.

TABLE 9

| 2# feedstock oil | Atmospheric residual oil |
| --- | --- |
| Density (at 20° C.), g/cm$^3$ | 0.8977 |
| CCR, wt % | 5.14 |
| Refractive index (at 70° C.) | 1.4884 |
| Viscosity (at 80° C.), mm$^2$/sec | 23.61 |
| Viscosity (at 100° C.), mm$^2$/sec | 13.72 |
| Condensed point, ° C. | 44 |
| Aniline point, ° C. | 97.7 |
| Element composition, wt % | |
| C | 86.89 |
| H | 12.77 |
| S | 0.13 |
| N | 0.21 |
| SARA, wt % | |
| Saturates | 62.7 |
| Aromatics | 23.0 |
| Resins | 12.7 |
| Asphaltenes | 1.6 |
| Boiling range, ° C. | |
| Initial point | 283 |
| 5% | 350 |
| 10% | 374 |
| 30% | 432 |
| 50% | 477 |
| 60% | 511 |
| UOP K | 12.3 |

TABLE 10

| | Example No. 15 | Example No. 16 |
| --- | --- | --- |
| | Catalyst No. C7 | Catalyst No. C8 |
| Reaction temperature, ° C. | 520 | 540 |
| C/O | 5.0 | 4.0 |
| WHSV, hr$^{-1}$ | 22.5 | 25.0 |
| Conversion, wt % | 76.7 | 79.5 |
| Total liquid products yield, wt % | 79.6 | 82.0 |
| Product yields, wt % | | |
| Dry gas | 2.7 | 2.6 |
| LPG | 29.7 | 30.9 |
| Gasoline | 37.8 | 40.2 |
| LCO | 12.1 | 10.9 |
| Coke | 6.5 | 5.8 |
| Bottoms | 11.2 | 9.6 |
| Composition of gasoline, wt % | | |
| Olefins | 33.0 | 31.1 |
| Aromatics | 28.3 | 28.9 |
| Isoparaffins | 29.2 | 31.2 |
| Properties of LCO | | |
| Density, (20° C.) kg/m$^3$ | 899 | 892 |
| Aniline point, ° C. | 41.2 | 41.4 |
| Cetane index | 34.7 | 35.8 |

TABLE 10-continued

| | Example No. 15 | Example No. 16 |
| --- | --- | --- |
| | Catalyst No. C7 | Catalyst No. C8 |
| Properties of LPG | | |
| Propylene content, wt % | 11.1 | 11.6 |
| Butene content, wt % | 7.6 | 8.5 |
| Isobutane content, wt % | 6.4 | 6.9 |

It can be seen from the results shown in Table 8 that, as compared with the reference catalysts, using the catalyst according to the present invention to carry out catalytic cracking of the same feedstock oil results in not only substantial increase of the conversion of feedstock and Total liquid products yield, but also substantial decrease of the olefin content of gasoline, increase of the content of aromatics and isoparaffins in gasoline, decrease of the density and increase of the aniline point and cetane number of the LCO, and substantial increase of the content of light olefins (especially propylene) and isobutane in LPG The results shown in Table 10 indicate similarly that, as compared with those in the prior art, the catalyst according to the present invention has not only higher cracking activity, but also results in higher quality of gasoline, LCO and LPG in cracking products.

EXAMPLES 17-22

Following examples illustrate the first kind of preferred catalysts according to the present invention and the process for preparing the same.

Catalysts C9-C14 according to the present invention were obtained by mixing and slurrying β-alumina trihydrate or a mixture of β-alumina trihydrate and pseudo-boehmite, molecular sieve, phosphorus compound and water (with or without clay), then spray-drying the resulting slurry into particles of 40-150 microns in diameter, and then calcining the resulting particles. The catalyst C14 was obtained according to the process of Example 22 by using alumina sol instead of pseudo-boehmite in Example 21. The amount of the β-alumina trihydrate and pseudo-boehmite (or alumina sol) used, the kind and amount of the clay used, and the kind and amount of the molecular sieve used, the kind and amount of the phosphorus compound used are shown respectively in Table 11-14. The spray-drying temperature, calcination temperature and time are shown in Table 15. The compositions of catalysts C9-C14 are shown in Table 16.

COMPARATIVE EXAMPLE 5

This comparative example illustrates the reference catalyst containing no phosphorus and the process for preparing the reference catalyst.

The reference catalyst CB3 was obtained by the same process as Example 17, except that no phosphorus compound was added and different amount of clay was used. The amount of the β-alumina trihydrate and pseudo-boehmite used, the kind and amount of the clay used, the kind and amount of the molecular sieve used are shown in Table 11-14, respectively. The spray-drying temperature, calcination temperature and time are shown in Table 15. The composition of the reference catalyst CB3 is shown in Table 16.

COMPARATIVE EXAMPLE 6

This comparative example illustrates the reference catalyst containing no η-alumina and the process for preparing the reference catalyst.

The reference catalyst CB4 was obtained by the same process as Example 17, except that pseudo-boehmite instead of β-alumina trihydrate was used. The amount of the pseudo-boehmite used, the kind and amount of the clay used, the kind and amount of the molecular sieve used, the kind and amount of the phosphorus compound used are shown in Table 11-14, respectively. The spray-drying temperature, calcination temperature and time are shown in Table 15. The composition of the reference catalyst CB4 is shown in Table 16.

TABLE 11

| Example No. | Amount of the β-alumina trihydrate used, kg | Amount of the pseudo-boehmite/alumina sol used, kg |
| --- | --- | --- |
| 17 | 59.4 | — |
| Comp. Exp. 5 | 59.4 | — |
| Comp. Exp. 6 | — | 61.3/0 |
| 18 | 34.4 | 25.8/0 |
| 19 | 64.1 | 38.7/0 |
| 20 | 31.3 | 9.7/0 |
| 21 | 39.1 | 24.2/0 |
| 22 | 39.1 | 0/69.4 |

TABLE 12

| Example No. | Kinds of molecular sieve | Amount of the molecular sieve used, kg |
| --- | --- | --- |
| 17 | REHY + ZRP-1 | 25 + 5 |
| Comp. Exp. 5 | REHY + ZRP-1 | 25 + 5 |
| Comp. Exp. 6 | REHY + ZRP-1 | 25 + 5 |
| 18 | $DASY_{2.0}$ + β + ZRP-1 | 30 + 8 + 10 |
| 19 | MOY + ZSM-5 + ZRP-1 | 16 + 12 + 5 |
| 20 | MOY + ZSM-5 | 14 + 9 |
| 21 | REHY + $DASY_{0.0}$ ++ ZSM-5 | 10 + 18 + 7 |
| 22 | REHY + $DASY_{0.0}$ ++ ZSM-5 | 10 + 18 + 7 |

TABLE 13

| Example No. | Kinds of clay | Amount of the clay used, kg |
| --- | --- | --- |
| 17 | Kaolin | 40.1 |
| Comp. Exp. 5 | Kaolin | 42.1 |
| Comp. Exp. 6 | Kaolin | 40.1 |
| 18 | Kaolin | 12.5 |
| 19 | — | — |
| 20 | Montmorillonite | 63.0 |
| 21 | Kaolin | 31.6 |
| 22 | Kaolin | 31.6 |

TABLE 14

| Example No. | Kinds of phosphor compound | Amount of the phosphor compound used, kg |
| --- | --- | --- |
| 17 | Diammonium hydrogen phosphate | 2.8 |
| Comp. Exp. 5 | — | — |
| Comp. Exp. 6 | Diammonium hydrogen phosphate | 2.8 |
| 18 | Sodium hexametaphosphate | 6.5 |
| 19 | Ammonium phosphate | 4.2 |
| 20 | Ammonium phosphate | 1.3 |
| 21 | Ammonium dihydrogen phosphate | 1.6 |
| 22 | Ammonium dihydrogen phosphate | 1.6 |

TABLE 15

| Example No. | Drying temperature, °C. | Calcination temperature, °C. | Calcination time, hrs |
| --- | --- | --- | --- |
| 17 | 110 | 500 | 1 |
| Comp. Exp. 5 | 110 | 500 | 1 |
| Comp. Exp. 6 | 110 | 500 | 1 |
| 18 | 120 | 350 | 3.5 |
| 19 | 120 | 600 | 0.5 |
| 20 | 120 | 450 | 0.8 |
| 21 | 160 | 550 | 1.5 |
| 22 | 90 | 550 | 1.5 |

TABLE 16

| Example No. | Catalyst No. | η-alumina, wt % | γ-alumina, wt % | Molecular sieve, wt % | Clay, wt % | $P_2O_5$, wt % |
| --- | --- | --- | --- | --- | --- | --- |
| 17 | C9 | 38.0 | 0 | 30.0 | 30.5 | 1.5 |
| Comp. Exp. 5 | CB3 | 38.0 | 0 | 30.0 | 32.0 | 0 |
| Comp. Exp. 6 | CB4 | 0 | 38.0 | 30.0 | 30.5 | 1.5 |
| 18 | C10 | 22.0 | 16.0 | 48.0 | 9.5 | 4.5 |
| 19 | C11 | 41.0 | 24.0 | 33.0 | 0 | 2.0 |
| 20 | C12 | 20.0 | 6.0 | 23.0 | 50.4 | 0.6 |
| 21 | C13 | 25.0 | 15.0 | 35.0 | 24.0 | 1.0 |
| 22 | C14 | 25.0 | 15.0 | 35.0 | 24.0 | 1.0 |

EXAMPLES 23-28

Following Examples illustrate the catalytic performances of the catalysts according to the present invention.

The catalysts C9-C14 were aged at 800° C. with 100% steam for 8 hrs, respectively. The catalytic cracking of 1# feedstock oil as shown in Table 7 was carried out in an ACE unit with 9 g of each aged catalysts C9-C14. Reaction conditions and reaction results are shown in Table 17.

Wherein, Conversion=Dry gas yield+LPG yield+Gasoline yield+Coke yield; Total liquid products yield=LPG yield+Gasoline yield+LCO yield. Herein, gasoline refers to a fraction with a distillation range of C5-221° C., LCO refers to a fraction with a boiling range of from 221° C. to 343° C., LPG refers to a C3-C4 fraction, dry gas is a fraction of $H_2$-$C_2$.

COMPARATIVE EXAMPLES 7-8

Following comparative examples illustrated catalytic performances of reference catalysts.

With the same process as Example 23, the catalyst was aged, and the catalytic cracking of the same feedstock oil was carried out at the same condition, except that catalyst used was the reference catalysts CB3 and CB4 said in Comparative Example 5 and Comparative Example 6, respectively. Reaction conditions and reaction results are shown in Table 17.

TABLE 17

| | Example No. | | | | | | | |
|---|---|---|---|---|---|---|---|---|
| | 23 | Comp. 7 | Comp. 8 | 24 | 25 | 26 | 27 | 28 |
| Catalyst No. | C9 | CB3 | CB4 | C10 | C11 | C12 | C13 | C14 |
| Reaction temperature, ° C. | 510 | 510 | 510 | 465 | 520 | 530 | 500 | 500 |
| C/O | 5.0 | 5.0 | 5.0 | 4.5 | 3.5 | 6 | 4.5 | 4.5 |
| WHSV, hr$^{-1}$ | 16.0 | 16.0 | 16.0 | 15.5 | 18.2 | 14.3 | 12.0 | 16.2 |
| Conversion, wt % | 76.5 | 72.2 | 71.3 | 77.4 | 75.3 | 74.2 | 75.6 | 74.7 |
| Product yields, wt % | | | | | | | | |
| Dry gas | 2.3 | 1.6 | 2.1 | 0.9 | 2.7 | 3.3 | 1.8 | 1.1 |
| LPG | 22.5 | 21.3 | 20.4 | 28.8 | 28.1 | 24.7 | 23.6 | 23.1 |
| Gasoline | 43.5 | 39.0 | 37.8 | 40.3 | 36.5 | 37.7 | 42.4 | 41.9 |
| LCO | 14.4 | 11.9 | 12.4 | 14.1 | 14.2 | 13.0 | 13.8 | 13.1 |
| Coke | 8.2 | 10.3 | 11.0 | 7.4 | 8.0 | 8.5 | 7.8 | 8.6 |
| Bottoms | 9.1 | 15.9 | 16.3 | 8.5 | 10.5 | 12.8 | 10.6 | 12.2 |
| Composition of gasoline, wt % | | | | | | | | |
| Olefins | 29.0 | 34.1 | 34.9 | 30.4 | 32.2 | 32.8 | 30.8 | 31.3 |
| Aromatics | 28.2 | 25.5 | 24.7 | 27.5 | 26.2 | 27.0 | 28.1 | 26.5 |
| Isoparaffins | 26.5 | 24.2 | 23.3 | 28.2 | 27.2 | 25.8 | 26.5 | 26.8 |
| Properties of LPG | | | | | | | | |
| Propylene content, wt % | 7.4 | 6.5 | 5.8 | 9.1 | 10.4 | 8.7 | 7.2 | 7.0 |
| Butene content, wt % | 6.7 | 5.9 | 5.6 | 9.7 | 11.7 | 8.5 | 6.8 | 7.5 |
| Isobutane content, wt % | 4.9 | 4.6 | 4.1 | 5.5 | 4.8 | 4.8 | 5.6 | 4.8 |

It can be seen from results shown in Table 17 that, as compared with the results obtained by using the reference catalysts, using the catalyst according to the present invention to carry out catalytic cracking of the same feedstock oil results in significantly decreasing the olefin content of gasoline, increasing the content of aromatics and isoparaffins in gasoline, and increasing obviously the content of light olefins (especially propylene) and isobutane in the LPG. This shows that the catalyst according to the present invention improves significantly quality of gasoline and LPG in cracking products.

EXAMPLES 29-34

Following examples illustrate the second kind of preferred catalysts according to the present invention and the process for preparing the same.

Catalysts C15-C20 according to the present invention were obtained by mixing and slurrying β-alumina trihydrate or a mixture of β-alumina trihydrate and pseudo-boehmite, molecular sieve, phosphorus compound, rare earth metal compound and water (with or without clay), spray-drying the resulting slurry into particles of 40-150 microns in diameter, then calcining the resulting particles. However, the catalyst C20 was obtained in Example 34 by using alumina sol instead of pseudo-boehmite in Example 33. The amount of the β-alumina trihydrate and pseudo-boehmite used, the kind and amount of the clay used, and the kind and amount of the molecular sieve used, the kind and amount of the phosphorus compound used and the amount of rare earth chloride solution used are shown respectively in Table 18-22. The spray-drying temperature, calcination temperature and time are shown in Table 23. Compositions of catalysts C15-C20 are shown in Table 24.

COMPARATIVE EXAMPLE 9

This comparative example illustrates the reference catalyst containing no phosphorus and no rare earth metal and the process for preparing the same.

The reference catalyst CB5 was obtained by the same process as Example 29, except that no phosphorus compound and no rare earth metal solution were added and different amount of clay was used. The amount of the β-alumina trihydrate and pseudo-boehmite used, the kind and amount of the clay used, the kind and amount of the molecular sieve used are shown in Table 18-21, respectively. The spray-drying temperature, calcination temperature and time are shown in Table 23. The composition of the reference catalyst CB5 is shown in Table 24.

COMPARATIVE EXAMPLE 10

This comparative example illustrates the reference catalyst containing no η-alumina and the process for preparing the reference catalyst.

The reference catalyst CB6 was obtained by the same process as Example 29, except that pseudo-boehmite instead of β-alumina trihydrate was used. The amount of the pseudo-boehmite used, the kind and amount of the clay used, the kind and amount of the molecular sieve used, the kind and amount of phosphorus compound used, and the amount of the solution of rare earth chloride used are shown respectively in Table 18-22. The spray-drying temperature, calcination temperature and time are shown in Table 23. The composition of the reference catalyst CB6 is shown in Table 24.

TABLE 18

| Example No. | Amount of the β-alumina trihydrate used, kg | Amount of the pseudo-boehmite/ alumina sol used, kg |
|---|---|---|
| 29 | 51.6 | — |
| Comp. Exp. 9 | 51.6 | — |
| Comp. Exp. 10 | — | 53.2 |
| 30 | 34.4 | 30.6 |
| 31 | 64.1 | 36.8 |
| 32 | 31.3 | 9.7 |

TABLE 18-continued

| Example No. | Amount of the β-alumina trihydrate used, kg | Amount of the pseudo-boehmite/ alumina sol used, kg |
|---|---|---|
| 33 | 46.9 | 24.2 |
| 34 | 46.9 | /69.4 |

TABLE 19

| Example No. | Kinds of molecular sieve | Amount of the molecular sieve used, kg |
|---|---|---|
| 29 | DASY$_{2.0}$ | 25 |
| Comp. Exp. 9 | DASY$_{2.0}$ | 25 |
| Comp. Exp. 10 | DASY$_{2.0}$ | 25 |
| 30 | MOY + DASY$_{0.0}$ | 3 + 42 |
| 31 | MOY + DASY$_{2.0}$ | 8 + 25 |
| 32 | REY | 23 |
| 33 | REHY + DASY$_{0.0}$ | 10 + 20 |
| 34 | REHY + DASY$_{0.0}$ | 10 + 20 |

TABLE 20

| Example No. | Kinds of clay | Amount of the clay used, kg |
|---|---|---|
| 29 | Kaolin | 51.3 |
| Comp. Exp. 9 | Kaolin | 55.3 |
| Comp. Exp. 10 | Kaolin | 51.3 |
| 30 | Kaolin | 10.3 |
| 31 | — | — |
| 32 | Montmorillonite | 62.5 |
| 33 | Kaolin | 30.3 |
| 34 | Kaolin | 30.3 |

TABLE 21

| Example No. | Kinds of phosphorus compound | Amount of the phosphorus compound used, kg |
|---|---|---|
| 29 | Diammonium hydrogen phosphate | 2.8 |
| Comp. Exp. 9 | — | — |
| Comp. Exp. 10 | Diammonium hydrogen phosphate | 2.8 |
| 30 | Sodium hexametaphosphate | 6.5 |
| 31 | Ammonium phosphate | 4.2 |
| 32 | Ammonium phosphate | 1.3 |
| 33 | Ammonium dihydrogen phosphate | 1.6 |
| 34 | Ammonium dihydrogen phosphate | 1.6 |

TABLE 22

| Example No. | Amount of the solution of rare earth chloride used, L |
|---|---|
| 29 | 6.8 |
| Comp. Exp. 9 | — |
| Comp. Exp. 10 | 6.8 |
| 30 | 7.8 |
| 31 | 5.5 |
| 32 | 1.8 |
| 33 | 4.6 |
| 34 | 4.6 |

TABLE 23

| Example No. | Drying temperature, °C. | Calcination temperature, °C. | Calcination time, hrs |
|---|---|---|---|
| 29 | 110 | 500 | 1 |
| Comp. Exp. 9 | 110 | 500 | 1 |
| Comp. Exp. 10 | 110 | 500 | 1 |
| 30 | 120 | 350 | 3.5 |
| 31 | 120 | 600 | 0.5 |
| 32 | 120 | 450 | 0.8 |
| 33 | 160 | 550 | 1.5 |
| 34 | 90 | 550 | 1.5 |

TABLE 24

| | Example No. | | | | | | | |
|---|---|---|---|---|---|---|---|---|
| | 29 | Comp. Exp. 9 | Comp. Exp. 10 | 30 | 31 | 32 | 33 | 34 |
| Catalyst No. | C15 | CB5 | CB6 | C16 | C17 | C18 | C19 | C20 |
| Composition, wt % | | | | | | | | |
| η-alumina | 33.0 | 33.0 | 0 | 22.0 | 41.0 | 20.0 | 30.0 | 30.0 |
| γ-alumina | 0 | 0 | 33.0 | 19.0 | 22.8 | 6.0 | 15.0 | 15.0 |
| Molecular sieve, | 25.0 | 25.0 | 25.0 | 45.0 | 33.0 | 23.0 | 30.0 | 30.0 |
| Clay | 39.0 | 42.0 | 39.5 | 7.8 | 0 | 50.0 | 23.0 | 23.0 |
| P$_2$O$_5$ | 1.5 | 0 | 1.5 | 4.5 | 2.0 | 0.6 | 1.0 | 1.0 |
| RE$_2$O$_3$ | 1.5 | 0 | 1.5 | 1.7 | 1.2 | 0.4 | 1.0 | 1.0 |

EXAMPLES 35-40

Following Examples illustrate the catalytic performances of the catalysts according to the present invention.

The catalysts C15-C20 were aged at 800° C. with 100% steam for 8 hrs, respectively. The catalytic cracking of 3# feedstock oil as shown in Table 25 was carried out in an ACE unit with 9 g of (inventory of) each aged catalysts C15-C20. Reaction conditions and reaction results are shown in Table 26.

Wherein, Conversion=Dry gas yield+LPG yield+Gasoline yield+Coke yield; Total liquid products yield=LPG yield+Gasoline yield+LCO yield. Herein, gasoline refers to a fraction with a distillation range of C5-221° C., LCO refers to a fraction with a boiling range of from 221° C.-343° C., LPG refers to a fraction from $C_3$ to $C_4$, dry gas is a fraction of $H_2$-$C_2$.

COMPARATIVE EXAMPLES 11-12

Following comparative examples are attended to illustrate catalytic performances of reference catalysts.

With the same process as Example 35, the catalyst was aged, and the catalytic cracking of the same feedstock oil was carried out at the same condition, except that catalyst used was the reference catalyst CB5 and CB6 of Comparative Example 9 and Comparative Example 10, respectively Reaction conditions and reaction results are shown in Table 26.

TABLE 25

| 3# feedstock oil | The mixture of a vacuum gas oil and a vacuum residuum |
|---|---|
| Density (at 20° C.), g/cm$^3$ | 0.9334 |
| Refractive index (at 70° C.) | 1.5129 |

TABLE 25-continued

| 3# feedstock oil | The mixture of a vacuum gas oil and a vacuum residuum |
|---|---|
| Viscosity (at 100° C.), mm$^2$/sec | 12.33 |
| Condensed point, ° C. | 35 |
| Element composition, wt % | |
| C | 86.89 |
| H | 11.80 |
| S | 1.3 |
| N | — |
| SARA, wt % | |
| Saturates | 54.5 |
| Aromatics | 33.4 |
| Resins | 11.4 |
| Asphaltenes | 0.7 |
| CCR, wt % | 3.40 |
| Boiling range, ° C. | |
| Initial point | 292 |
| 5% | 373 |
| 10% | 395 |
| 30% | 430 |
| 50% | 458 |
| 70% | 502 |

TABLE 26

| | Example No. | | | | | | | |
|---|---|---|---|---|---|---|---|---|
| | 35 | Comp. 11 | Comp. 12 | 36 | 37 | 38 | 39 | 40 |
| Catalyst No. | C15 | CB5 | CB6 | C16 | C17 | C18 | C19 | C20 |
| Reaction temperature, ° C. | 510 | 510 | 510 | 460 | 530 | 490 | 500 | 500 |
| C/O | 5.0 | 5.0 | 5.0 | 6.0 | 3.5 | 4.5 | 5.5 | 5.5 |
| WHSV, hr$^{-1}$ | 26.0 | 26.0 | 26.0 | 30.0 | 28.0 | 24.0 | 24.0 | 24.0 |
| Conversion, wt % | 78.4 | 74.7 | 72.8 | 83.8 | 82.0 | 81.2 | 79.6 | 79.1 |
| Total liquid products yield, wt % | 85.2 | 78.5 | 76.5 | 88.6 | 86.8 | 86.0 | 87.3 | 86.5 |
| Product yields, wt % | | | | | | | | |
| Dry gas | 1.7 | 2.3 | 2.9 | 1.8 | 1.8 | 1.9 | 1.6 | 1.7 |
| LPG | 16.7 | 15.9 | 14.6 | 17.1 | 16.6 | 16.9 | 16.7 | 16.1 |
| Gasoline | 55.4 | 50.7 | 49.2 | 61.3 | 58.9 | 57.5 | 57.1 | 56.8 |
| LCO | 13.1 | 11.9 | 12.7 | 10.2 | 11.3 | 11.6 | 13.5 | 13.6 |
| Coke | 4.6 | 5.8 | 6.1 | 3.6 | 4.7 | 4.9 | 4.2 | 4.5 |
| Bottoms | 8.5 | 13.4 | 14.5 | 6.0 | 6.7 | 7.2 | 6.9 | 7.3 |
| Composition of gasoline, wt % | | | | | | | | |
| Olefins | 31.2 | 33.8 | 34.3 | 26.5 | 28.6 | 29.2 | 30.3 | 30.7 |
| Aromatics | 25.1 | 22.9 | 22.3 | 29.2 | 26.4 | 27.6 | 26.7 | 26.0 |
| Isoparaffins | 28.3 | 25.2 | 25.8 | 30.2 | 28.7 | 28.0 | 27.9 | 28.5 |

It can be seen from results shown in Table 26 that, as compared with the results obtained by using the reference catalysts, using the catalyst according to the present invention to carry out catalytic cracking of the same feedstock oil results in decreasing remarkably the olefin content of gasoline, increasing the content of aromatics and isoparaffins in gasoline. This shows that the catalyst according to the process of the present invention not only has higher cracking activity i.e. higher yield of light oil and LPG in cracking products, but also improves significantly the quality of gasoline in cracking products.

The invention claimed is:

1. A catalyst for fluidized catalytic cracking comprising alumina, phosphorous and molecular sieve, wherein said alumina comprises η-alumina, χ-alumina, and γ-alumina, and wherein the catalyst comprises, on the basis of the total amount of the catalyst:

0.5-50 wt % of η-alumina;
less than 50 wt % of χ-alumina and γ-alumina;
10-70 wt % of molecular sieve, said molecular sieve is one or more selected from the group consisting of large pore zeolites and medium pore zeolites;
greater than 0 to 75 wt % of clay;
0.1-5.5 wt % of phosphorous, measured as $P_2O_5$; and
0.1-2 wt % of rare earth metal, measured as oxide, wherein the phosphorous is impregnated in the catalyst.

2. The catalyst according to claim 1, wherein the catalyst comprises, on the basis of the total amount of the catalyst:

5-45 wt % of η-alumina;
less than 40 wt % of χ-alumina and γ-alumina;
20-50 wt % of molecular sieve, said molecular sieve is one or more selected from the group consisting of large pore zeolites and medium pore zeolites;
greater than 0 to 60 wt % of clay;
0.5-5.5 wt % of phosphorous, measured as $P_2O_5$; and
0.2-1.8 wt % of rare earth metal, measured as oxide, wherein the phosphorous is impregnated in the catalyst.

3. The catalyst according to claim 1, wherein said large pore zeolite is one or more selected from the group consisting of faujasite, zeolite-β and mordenite.

4. The catalyst according to claim 3, wherein said large pore zeolite is one or more selected from the group consisting of a zeolite-Y, a zeolite-Y comprising one or more selected from phosphorous, iron and rare earths, an ultrastable zeolite-Y, an ultrastable zeolite-Y comprising one or more selected from phosphorous, iron and rare earths, a zeolite-BY, an zeolite-HY comprising one or more selected from phosphorous, iron and rare earths, and zeolite-β.

5. The catalyst according to claim 1, wherein said medium pore zeolite is one or more selected from the group consisting of a MFI-structured zeolite and a MFI-structured zeolite comprising one or more selected from phosphorous, iron and rare earths.

6. The catalyst according to claim 1, wherein said molecular sieve is one or more selected from the group consisting of a zeolite-Y, a zeolite-Y comprising one or more selected from phosphorous, iron and/or rare earths, an ultrastable zeolite-Y, an ultrastable zeolite-Y comprising one or more selected from phosphorous, iron and rare earths zeolite-HY, a zeolite-HY comprising one or more selected from phosphorous, iron and rare earths, zeolite-β, a MFI-structured zeolite, a MFI-structured zeolite comprising one or more selected from phosphorous, iron and rare earths, and SAPO molecular sieve.

7. The catalyst according to claim 1, wherein said molecular sieve comprises a mixture of a zeolite-Y and the MFI-structured zeolite, and wherein the content of the zeolite-Y is 30-90 wt %, the content of the MFI-structured zeolite is 10-70 wt %, based on the total amount of said zeolite mixture.

8. The catalyst according to claim 7, wherein the content of the zeolite-Y is 40-85wt %, the content of the MFI-structured zeolite is 15-60 wt %, based on the total amount of said zeolite mixture.

9. The catalyst according to claim 7, wherein said zeolite mixture further comprises zeolite-β, and wherein the content of the zeolite-β is greater than 0to 30 wt %, based on the total amount of said zeolite mixture.

10. The catalyst according to claim 9, wherein the content of zeolite-β is greater than 0 to 20 wt %, based on the total amount of said zeolite mixture.

11. The catalyst according to claim 1, wherein said clay is one or more selected from the group consisting of kaolin, halloysite, montmorillonite, kieselguhr, allokite, soapstone, rectorite, sepiolite, attapulgus, hydrotalcite, and bentonite.

12. A process for preparing the catalyst according to claim 1, comprising:
  drying a slurry comprising a mixture of an aluminum compound able to form η-alumina and an aluminum compound able to form χ-alumina and an aluminum compound able to form γ-alumina, molecular sieve and water, the drying temperature being from room temperature to 200° C.; and adding further a phosphorus compound and a rare earth metal compound, and then calcining the slurry, the calcining temperature being from higher than 200° C. to 750° C.,
  wherein, after calcination, said aluminum compounds are converted to a mixture comprising η-alumina, χ-alumina and γ-alumina, and wherein the resulting catalyst comprises, on the basis of the total amount of the catalyst:
  0.5-50 wt % of η-alumina;
  less than 50 wt % of χ-alumina and γ-alumina;
  10-70 wt % of molecular sieve;
  greater than 0 to 75 wt % of clay;
  0.1-5.5 wt % of phosphorous, measured as $P_2O_5$; and
  0.1-2 wt % of rare earth metal, measured as oxide.

13. The process for preparing the catalyst according to claim 12, comprising:
  wherein said molecular sieve is a zeolite mixture comprising a zeolite-Y and the MFI-structured zeolite, and wherein the content of the zeolite-Y is 30-90 wt %, the content of the MFI-structured zeolite is 10-70 wt %, based on the total amount of said zeolite mixture.

14. The process according to claim 12, wherein said rare earth metal compound is one or more selected from the group consisting of rare earth chloride and rare earth nitrate.

15. The process according to claim 12, wherein the aluminum compound that is able to form η-alumina is β-aluminum trihydrate, the aluminum compound able to form χ-alumina is α-aluminum trihydrate, and said aluminum compound able to form γ-alumina is bohemite, pseudo-boehmite and/or alumina sol.

16. The process according to claim 12, wherein said phosphorous compound is one or more selected from the group consisting of phosphoric acid, phosphate, phosphorous acid, phosphite, pyrophosphoric acid, pyrophosphate, polyphosphoric acid, polyphosphate, metaphosphoric acid, and metaphosphate.

17. The process according to claim 16, wherein said phosphorous compound is one or more selected from the group consisting of phosphoric acid, ammonium phosphate, diammonium hydrogen phosphate, ammonium dihydrogen phosphate, phosphorous acid, ammonium phosphite, sodium pyrophosphate, sodium tripolyphosphate and sodium hexametaphosphate.

18. The catalyst of claim 1 wherein said catalyst composition comprising η-alumina, χ-alumina, γ-alumina, large and medium pore molecular zeolites, phosphorous, and rare earth metal, decreases the olefin content of gasoline.

19. The catalyst of claim 1 wherein said phosphorous is present at 0.1-4.5 wt %, measured as $P_2O_5$.

20. The catalyst of claim 19 wherein said phosphorous is present at 0.1-3.0 wt %, measured as $P_2O_5$.

21. The catalyst of claim 20 wherein said phosphorous is present at 0.1-2.5 wt %, measured as $P_2O_5$.

22. The catalyst of claim 21 wherein said phosphorous is present at 0.1-2.0 wt %, measured as $P_2O_5$.

23. The catalyst of claim 22 wherein said phosphorous is present at 0.1-1.5 wt %, measured as $P_2O_5$.

24. The catalyst of claim 23 wherein said phosphorous is present at 0.1-1.0 wt %, measured as $P_2O_5$.

25. A process for preparing the catalyst according to claim 1, comprising:
  adding a phosphorous compound to a slurry comprising a mixture of an aluminum compound able to form η-alumina and an aluminum compound able to form χ-alumina and an aluminum compound able to form γ-alumina, molecular sieve and water,
  drying the slurry to which the phosphorous compound has been added, and calcining the slurry that has been dried,
  wherein, after calcination, said aluminum compounds are converted to a mixture comprising η-alumina, χ-alumina and γ-alumina, and wherein the resulting catalyst comprises, on the basis of the total amount of the catalyst:
  0.5-50 wt % of η-alumina;
  less than 50 wt % of χ-alumina and γ-alumina;
  10-70 wt % of molecular sieve;
  greater than 0 to 75 wt % of clay;
  0.1-5.5 wt % of phosphorous, measured as $P_2O_5$; and
  0.1-2 wt % of rare earth metal, measured as oxide.

26. The process of claim 25 wherein the drying temperature is room temperature to 200° C.

27. The process of claim 25 wherein the calcining temperature is from 300° C. to 600° C.

28. The catalyst obtained by the process of claim 12.
29. The catalyst obtained by the process of claim 13.
30. The catalyst obtained by the process of claim 25.

* * * * *